Oct. 30, 1923.

H. S. DICKINSON 1,472,637

WHEELED PLOW

Filed July 25, 1918

INVENTOR
H S Dickinson
BY
Rogers Kennedy Campbell
ATTORNEY

Oct. 30, 1923.

H. S. DICKINSON

1,472,637

WHEELED PLOW

Filed July 25, 1918   7 Sheets-Sheet 4

INVENTOR
H S Dickinson
BY
Rogers Kennedy Campbell
ATTORNEY

Oct. 30, 1923.

H. S. DICKINSON

WHEELED PLOW

Filed July 25, 1918

INVENTOR
H. S. Dickinson
BY
Roger Kennedy Campbell
ATTORNEY

Patented Oct. 30, 1923.

1,472,637

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

WHEELED PLOW.

Application filed July 25, 1918. Serial No. 246,640.

*To all whom it may concern:*

Be it known that I, HARRY S. DICKINSON, a citizen of the United States, residing at Moline, in the county of Rock Island and State of Illinois, have invented certain new and useful Improvements in Wheeled Plows, of which the following is a specification, reference being had therein to the accompanying drawing.

This invention relates to wheel plows, and has reference more particularly to plows of the gang type in which the plowing devices are carried by a frame supported at opposite sides by ground wheels. The invention consists in certain novel features of construction in the mechanism for raising and lowering the plows from the power derived from the travel of the machine through the field, and in the means for controlling said mechanism; whereby the attendant will be enabled to raise and lower the plows and regulate their depth of cut with ease and facility while the machine is in operation.

In the accompanying drawings I have shown my invention applied to a plow in which plowing devices in the form of disks are carried by a beam adjustable laterally to vary the width of the furrow slices, said features forming the subject matter of a divisional application filed by me on the 14th day of February 1919, Serial No. 276,890. It will be manifest, however, that the present invention is not limited in its application to the particular type of plow shown, but is applicable as well to other types of plows.

Figures 1, 15, 16:
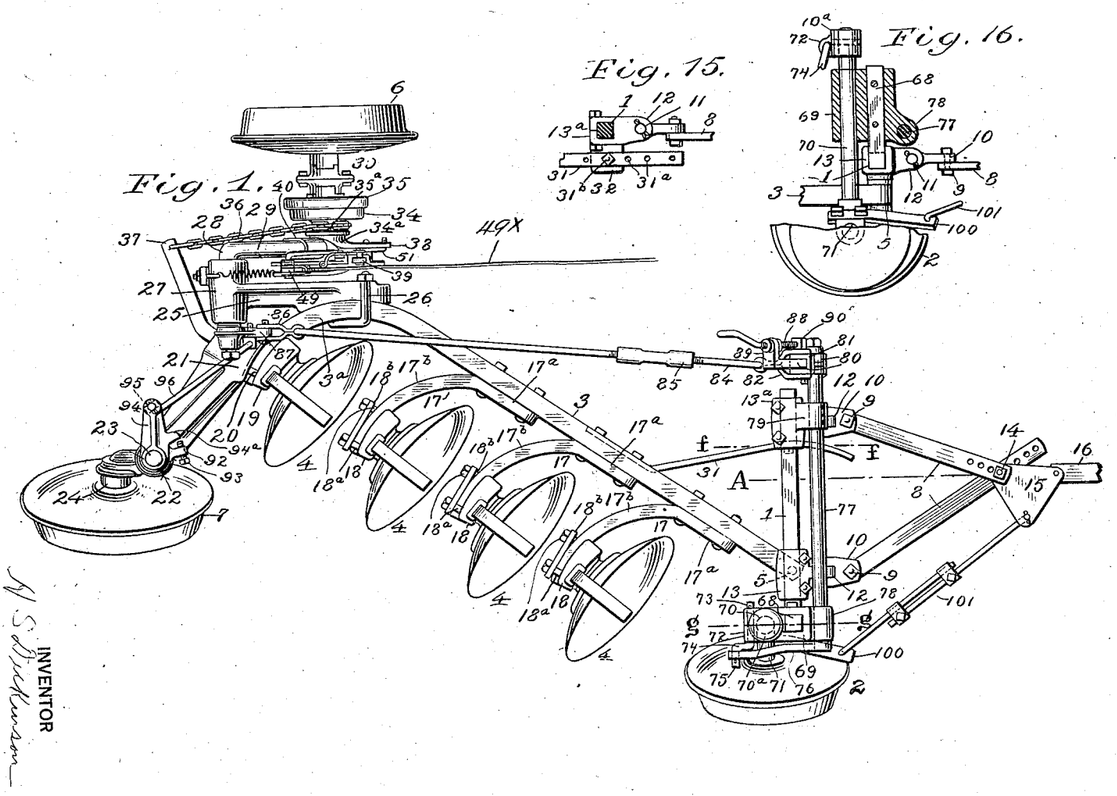
Fig. 1 is a top plan view of a disk gang plow having my invention embodied therein, the disks being adjusted to cut wide furrow slices.
Fig. 15 is a section on the line $f$—$f$ of Fig. 1.
Fig. 16 is a vertical section on the line $g$—$g$ of Fig. 1.
Figure 2:
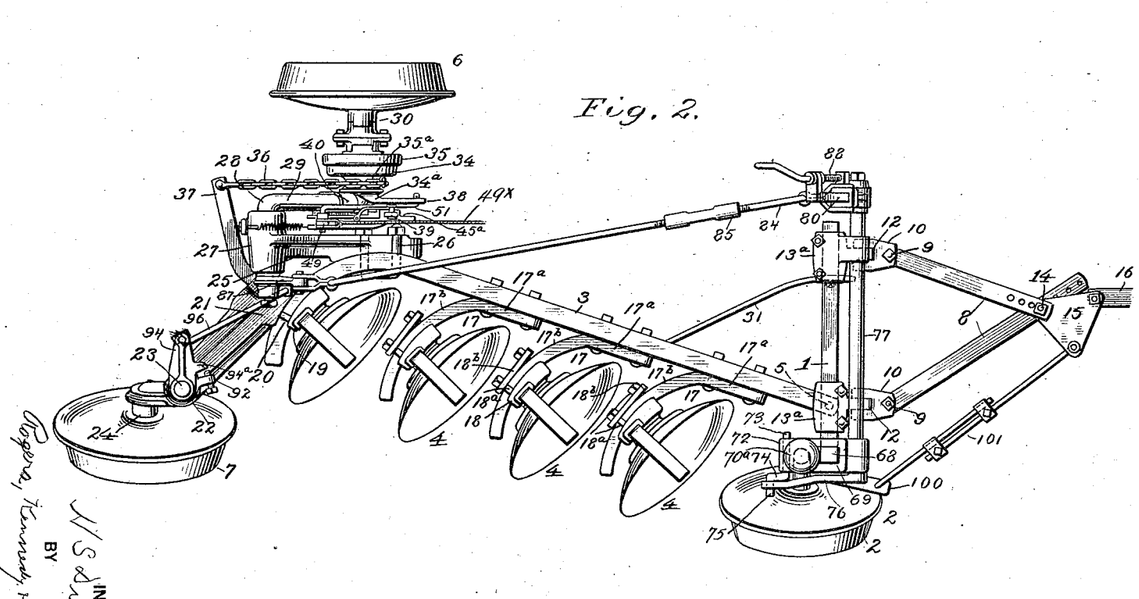
Fig. 2 is a similar view showing the disks adjusted to cut narrower furrow slices.

Referring to the drawings:

Referring particularly to Figs. 1 and 2, my improved plow comprises as its main features a front transverse frame member in the form of a frame bar 1, supported at its furrow end by a front furrow wheel 2; a rearwardly extending diagonal disk carrying beam 3 equipped with a number of plowing disks 4, pivotally connected at its forward end on a vertical axis 5 to the frame member 1; a land wheel 6 supporting the beam at its rear end on its land side; and a rear furrow wheel 7 supporting the rear end of the beam on its furrow side.

The draft is applied to the frame bar 1 on a line A—A at right angles to said bar, in the present instance by means of a draft frame comprising two draft links 8 whose rear ends are connected by vertical pivot bolts 9 respectively to two coupling blocks 10. These blocks are in turn pivoted by means of horizontal pivot bolts 11 to lugs 12 projecting forwardly from sleeves 13 and 13$^a$ surrounding and fixed to the bar 1 at widely separated points. From their rear ends the draft links converge and have their forward ends connected together by a bolt 14. A draft plate 15 is connected with the bolt 14 and to this plate a draft bar 16 is pivoted and affords a means for the connection of the source of draft power, a tractor or draft team as the case may be. Other forms of devices for applying the draft to the frame bar 1 may be employed, that shown being merely by way of example and acting to apply the draft at right angles to the bar 1.

The plowing disks 4 are sustained by disk carrying arms 17, each comprising a forward straight portion 17$^a$ which is seated flatly against and bolted to the furrow side of the beam 3, and a rear curved portion 17$^b$ which extends outwardly from the beam in a curve struck from a centre located in front of the arm, there being in the present instance three of these arms to sustain three disks. The rear end of the beam is curved in a furrowward direction similar to the curvature of the portions 17$^b$ of the arms 17, and constitutes a lateral supporting arm 3$^a$ for a fourth disk at the rear. The three forward disks are rotatably mounted on disk bearings 18 which are adjustably clamped to the curved portions 17$^b$ of the respective arm 17 by means of clamping bolts 18$^a$ which extend respectively on opposite sides of the arms through clamping plates 18$^b$ and into the disk bearings, so that the bearings may be adjusted along the arms to and from the beam. The rear disk is mounted on a disk bearing 19 which is adjustably clamped to the rear lateral end 3$^a$ of the beam by means of clamping bolts 20 which pass through the inner end of a casting or wheel supporting arm 21 applied to the rear side of the lateral end 3$^a$, the bolts extending respectively on opposite sides of the arm and into the bearing, by which means the disk bearing and also the arm 21 may be adjusted along the lateral end 3$^a$ of the beam similar to the adjustments of the other disk bearings, the purpose of which adjustments will presently appear. The wheel supporting arm 21 extends in a furrowward direction and is provided on its outer extremity with an upright bearing 22 in which is loosely mounted an upright furrow wheel stem 23, the lower end of which is formed with an outwardly extending wheel journal 24 on which the rear furrow wheel 7 is rotatably mounted.

Also adjustably connected with the rear end 3$^a$ of the beam at its land side at a point in advance of the disk bearing 19, is an upwardly extending supporting frame 25 which is clamped to the beam by means of a clamping bolt 26 embracing the beam and the lower portion of the supporting frame so that this supporting frame may be adjusted along the curved lateral end of the beam similar to the adjustment of the disk bearing 19. The upper end of the supporting frame is provided with a horizontal transversely extending bearing 27 in which is loosely mounted the upper cranked end or journal 28 of a land wheel axle 29 whose lower end is provided with a horizontal axle arm 30 on which the land wheel 6 is rotatably mounted.

From the construction described it will be understood that the disks, the rear furrow wheel, and the land wheel, are all mounted on and carried by the single diagonal beam 3, which being pivotally connected at its forward end to the transverse frame bar 1, may be adjusted on said pivot to different angular positions relatively to the frame bar and line of draft in order to vary the transverse spacing of the disks and consequently the character of the furrow slice cut by the disks.

The beam 3 is held in its different positions of adjustment by means of a horizontal arm 31 which is fixed at its rear end to the beam and which extends forwardly therefrom alongside a lug 32 depending from the sleeve 13$^a$, the arm being provided with a number of holes 31$^a$ through any one of which a bolt 31$^b$ may be passed and into the lug 32 to fasten the arm to the lug.

In adjusting the disks to increase the transverse space between them so as to adapt them for cutting wider furrow slices in soft ground, the beam is swung on its pivot 5 in a landward direction to cause it to assume a greater obliquity to the line of draft A—A, and it is held in its adjusted position by the bolt 31$^b$. This position of the parts is shown in Fig. 1 where it will be seen that the disk bearings have been set at the outer extremities of the arms 17$^b$ and the outer end of the lateral curved end 3$^a$ of the beam, in order to secure the proper angle of the disks to the line of draft. Also it will be seen that the wheel carrying arm 21 has been set at the outer extremity of the lateral portion 3$^a$ of the beam in order to preserve the proper relation of the rear furrow wheel to the furrow made by the rear disk and to the line of draft; and finally it will be seen that the frame 25 on which the land wheel is mounted has been set towards the end of the lateral portion 3$^a$ of the beam in order to maintain the parallelism of the land wheel with the line of draft. In adjusting the disks for cutting narrower furrow slices in difficult or hard land, the beam is released by the removal of the bolt 31$^b$ and is then swung on its pivot 5 in a furrowward direction to the position shown in Fig. 2 in order to bring the disks more nearly in line with each other and thereby decrease the transverse space between them, and when the proper adjustment has been attained, the arm 31 is secured by the bolt 31$^b$ in its new position. The disks are now adjusted in a landward direction on the curved supporting arms to maintain their proper angles in their new positions to the line of draft, the rear furrow wheel arm being likewise adjusted to preserve the proper relation of the rear furrow wheel to the rear disk, and finally the land wheel support is adjusted on the beam in a landward direction to maintain the parellelism of the land wheel with the line of draft.

In these different adjustments of the beam, the front frame bar 1 is always at right angles to the line of draft, and as the front furrow wheel is sustained by this frame bar, no change is required in its relation to the draft when the beam is adjusted to vary the cut of the disks.

It will be noted from the foregoing description that the adjustments of the disks to vary the widths of the furrow slices is effected by the swinging movement of a single beam or frame member to which the disk carrying arms are permanently attached, and consequently there are no overlapping adjustable beam sections difficult to bolt together and liable to become loose, and no projection of the beam in front or in rear of the carrying wheels in the different positions of the disks. Furthermore, by reason of the fact that the rear furrow wheel support and the land wheel support are sustained by the beam itself, as distinguished from the bearing of the rear disk, this bearing is not subject to undue strains and is not required to be of undue size and out of proportion to the other disk bearings. The improved construction is therefore of unusual simplicity, is strong, solid and durable, and wholly free from detachably connected parts so difficult to maintain in firm fixed relations and so apt to become loose or displaced. At the same time the adjustability of the disks may be conveniently and quickly effected, and their angular relations with respect to the line of draft preserved in their different spaced positions. This latter feature, however, is a matter of choice rather than an essential characteristic, for if for any reason it is found advisable to change the angular relations of the disks as the change of cut is made, it would be only necessary to change the character of the curvature of the respective disk carrying arms.

Referring now to the feature of my invention for raising and lowering the plows and for controlling their depth of cut, I propose to utilize the power derived from the rotation of the land wheel to effect these operations, and to control the same by controlling devices extending within reach of the attendant operating the tractor, the said mechanism being characterized by a clutch controlled winding drum on the land wheel axle, as set forth in an application for Letters Patent of the United States filed by me on the 12th day of August, 1915, Ser. No. 45,095. The present invention with respect to this mechanism, is concerned with various improvements therein designed to give the attendant a more complete, ready and easy control of the mechanism and to enable him to vary the depth of cut with certainty and facility, and to avoid the liability of the connection of the clutch at improper times, for instance when the plows are to be lowered into action.

As shown more particularly in Figs. 1, 3, 5, 7, 10 and 11, the land wheel has fixed to its hub a driving member 35 of a friction clutch whose driven member 34 loosely surrounds an oscillating cam sleeve 34$^a$ on the axle arm 30 of the land wheel axle at its inner end, the said driven clutch member being provided with a winding drum 35$^a$ to which is connected the forward end of a winding chain 36 whose rear end is anchored to an arm 37 fixed to the furrow wheel supporting arm 21. The arrangement and construction of these parts is such that when the driven clutch member is shifted into engagement with the driving clutch member, by the oscillation of the cam sleeve 34$^a$ by means of a clutch operating lever 38 connected with said sleeve, the driven clutch member will be rotated by the rotation of the land wheel, and winding the chain on the winding drum, the land wheel axle will be swung from its forwardly inclined position rearwardly as indicated by the dotted line arrow in Fig. 11, thereby lowering the land wheel and raising the rear end of the beam and consequently the plows carried by said beam, the forward end of the beam in this action being correspondingly raised by an adjustment of the front furrow wheel effected automatically by the lowering of the land wheel, as will be more fully described hereinafter.

Figure 11:
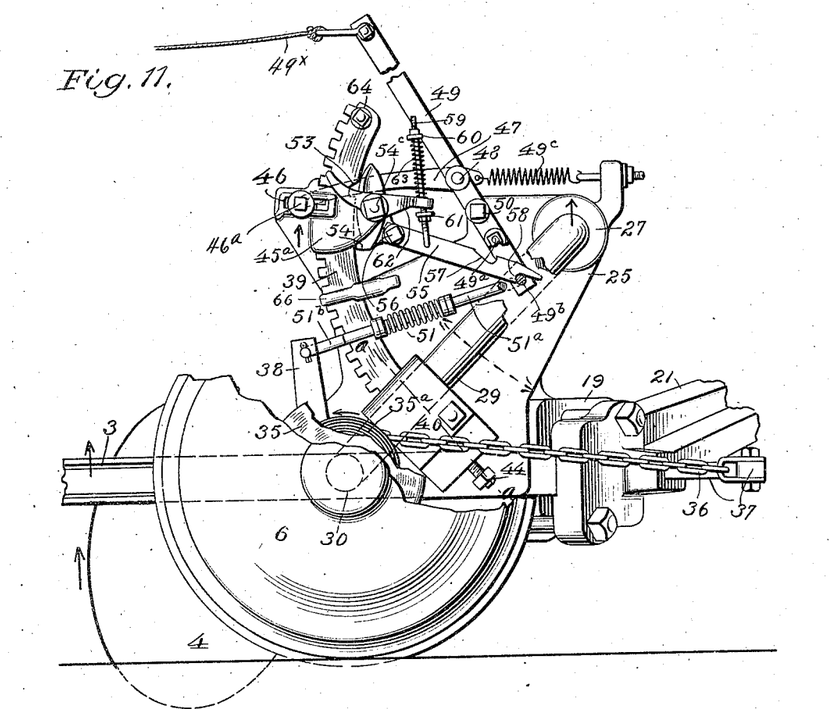
Fig. 11 is a view similar to Fig. 10 showing the position of the parts after the controlling lever has been fully operated to connect the clutch to raise the plows.
Figure 12:
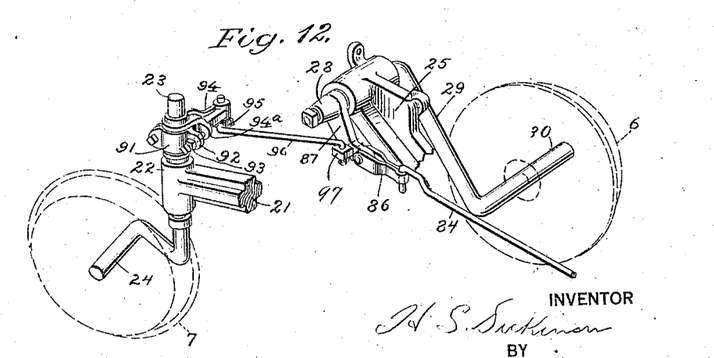
Fig. 12 is a fragmentary perspective view of the land wheel and rear furrow wheel, and the connections between the two for controlling the furrow wheel by the up and down movements of the land wheel.
Figure 13:
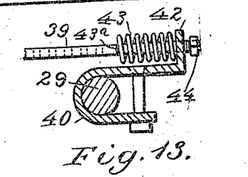
Fig. 13 is a section on the line $d$—$d$ of Figs. 7, 10 and 11.

The land wheel axle is held in its different adjusted positions by means of a toothed arm or rack bar 39 connected at its lower end by a bracket 40 fixed to the swinging land wheel axle, as shown in Figs. 11 and 12 the said rack bar being curved in an arc whose centre is coincident with the axis of the journal 28 of the axle. The lower extremity of the rack slides to a limited extent through a hole in a lateral lug 42 on the bracket 40, and it is cushioned by means of a cushioning spring 43 encircling the lower portion of the rack bar and bearing at one end against the lug and at its opposite end against a shoulder 43ᵃ on the rack, the end of the rack having a head 44 screwed thereon which is adapted to engage the under side of the lug. By this means, while the rack bar will be caused to move up and down with the swinging movements of the axle, and the latter will be capable of a slight upward movement relative to the rack bar subject to the cushioning action of the spring, which will avoid injury to or breakage of the locked parts in the travel of the machine through the field.

In the swinging movements of the rack bar it slides through and is guided in a vertical guiding slot 45 formed in a housing 45ᵃ on the supporting frame 25, the teeth on the rack bar facing forwardly so that they will register with a horizontal slot 46 in the frame communicating with the guiding slot. A locking bolt 46ᵃ is mounted to slide in the horizontal slot and is adapted to engage in the respective spaces between the teeth on the rack bar as said spaces register with the slot, by which means the rack bar may be locked by the locking bolt and held in different positions to hold the plows in their different positions of adjustment. The locking bolt is carried on the forward end of a horizontal arm 47 pivoted at its rear end as at 48 to an upright controlling lever 49, which lever is pivoted near its lower end as at 50 to the ssupporting frame 25, and is acted on by a spiral tension spring 49ᶜ connected to the lever above its axis and to the frame, and tending to draw the lever rearwardly and thereby engage the locking bolt with the rack bar. The lower end of the lever is connected with the clutch operating lever 38 by means of a spring yieldable link 51 pivoted at its opposite ends respectively to the controlling lever and to the clutch operating lever. As a result of this construction, when the upper end of the controlling lever is drawn forwardly, as by means of a cord or cable 49ᵇ connected thereto and extending within reach of the attendant, the locking bolt 46ᵃ will be thrust forward from between the teeth on the rack bar and will thus release the same.

Figures 7, 8, 14:
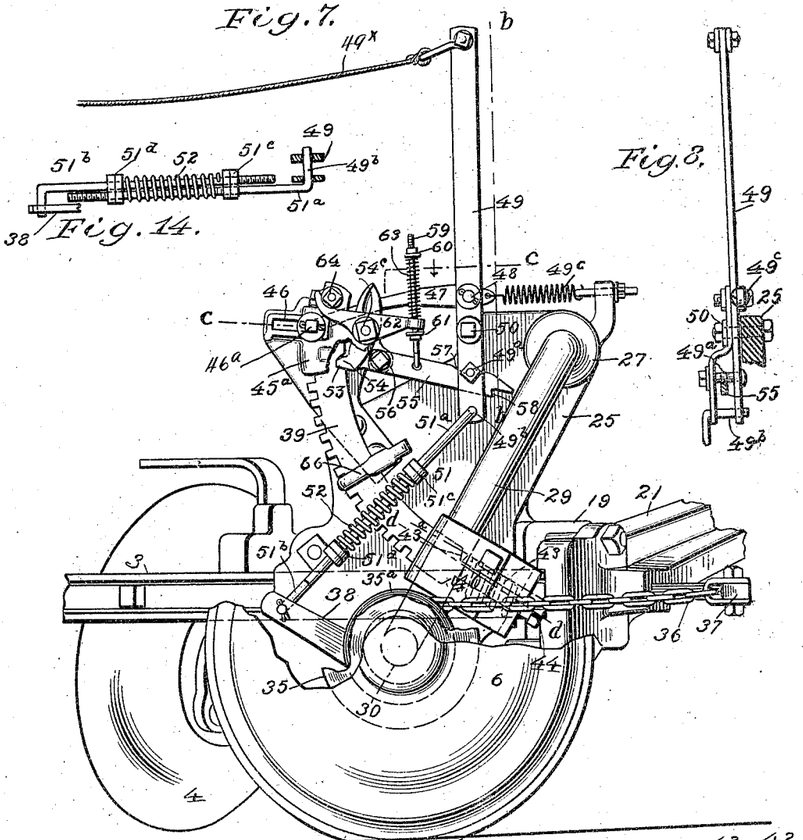
Fig. 7 is a side elevation on an enlarged scale of the land wheel, the mechanism operated thereby for raising and lowering the plows, and the controlling devices for said mechanism, the parts being in the position they occupy when the plows are fully raised out of action.
Fig. 8 is a vertical sectional elevation on the line $b$—$b$ of Fig. 7.
Fig. 14 is a section on the line $e$—$e$ of Fig. 7.
Figure 9:
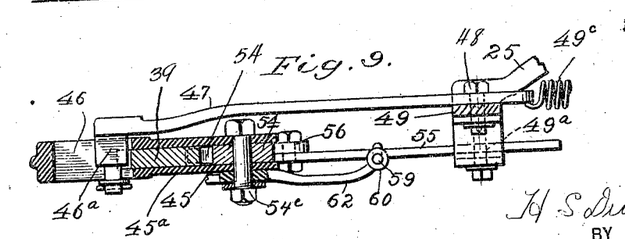
Fig. 9 is a horizontal section on an enlarged scale on the line $c$—$c$ of Fig. 7.

The spring yieldable link 51 above referred to consists of an upper rod 51ᵃ connected with the controlling lever 49, and a lower rod 51ᵇ connected with the clutch operating lever, which rods overlap each other and extend side by side, a head or washer 51ᶜ being fixed to the upper end of the lower rod and being provided with an opening through which the upper rod slides, and a head or washer 51ᵈ being fixed to the lower end of the upper rod and being provided with a hole through which the lower rod slides. A spiral spring 52 encircles the overlapping portions of the rods and bears at its opposite ends respectively against the two washers, so that when a pulling force is exerted on the upper rod, as when the lever 49 is drawn forwardly, at its upper end the upper rod will move endwise relatively to the lower rod and the spring will be compressed between the washers. The purpose of this construction is to enable the controlling lever to be moved to a limited extent without actuating the clutch operating lever, as for instance when the latch bolt 46ᵃ is operated to release the rack when the plows are in elevated position as shown in Fig. 7, to permit the plows to be lowered into action. The spring is of such tension that the controlling lever will be permitted under these conditions to move sufficiently far by compressing the spring, to disengage the bolt from the notches without actuating the clutch operating lever, so that the clutch will not be thrown into action and will not therefore interfere with the descent of the plows by gravity. But when the controlling lever is moved forwardly further, the spring will be further compressed as shown in Fig. 11 and will offer such resistance to the movement of the upper rod that the lower rod will be compelled to move with it and will thereby actuate the clutch controlling lever, this operation of the parts being performed when the plows are to be elevated either partially or wholly as will be more fully described later on.

The rear edge of the rack bar near its upper end is provided with a notch 53 which, when the land wheel axle is in the position shown in Fig. 7 with the plows fully elevated, is engaged by the nose of a locking dog 54 pivoted between its ends as at 54ᶜ to the supporting frame 25, whereby the rack bar will be locked and the plows held in raised position. A connecting bar 55 is pivotally connected at its forward end as at 56 to the locking dog at a point below the pivotal axis of the same, and is provided near its rear end with an upper notch 57, and at its rear extremity on its under side with a lower notch 58, which notches are adapted to be engaged respectively by an upper pin 49ᵃ and a lower pin 49ᵇ on the controlling lever, as will be more fully described hereinafter, the arrangement being such that when the connecting bar is drawn rearwardly, it will rock the locking dog on its axis and withdraw its nose from the notch in the rack bar, thereby releasing the rack bar. An upright rod 59 is pivoted at its lower end to the connecting bar between the ends of the latter, and has fixed to it an upper washer 60 and a lower washer 61, the portion of said rod between the two washers passing loosely through the rear end of a rocking lever 62 pivoted between its ends on the axis of the locking dog 54, and a spiral spring 63 encircling the rod between the washers and bearing at its upper end against the upper washer and at its lower end against the rear end of the rocking lever. The forward end of the rocking lever extends alongside the rack bar in such position that it will be engaged by a stop 64 on the side of the rack bar at its upper end when the rack bar is in a lowered position with the plows fully raised as shown in Fig. 7. In this position of the parts the rocking lever is held against rocking motion by its engagement with the stop 64, and the spring 63 is under tension and exerting a lifting force on the connecting bar. When however the rack bar moves upwardly and disengages the stop 64 from the rocking lever, the latter will be free to rock down at its rear end, thereby relieving the tension of the spring and its lifting force on the connecting bar, and the latter will be allowed to rock down as shown in Fig. 11.

The operation of the mechanism so far described is as follows:

Assume that the land wheel axle and rack bar are in lowered position with the plows elevated as shown in Fig. 7. In this position of the parts, the locking dog 54 is engaged in the rear notch in the rack bar and is locking the plows raised. Also the locking bolt 46ᵃ is engaged with the forward edge of the rack bar and is held engaged by the spring 49ᶜ. The rocking lever 62 is engaged by the stop 64 on the rack bar, and spring 63 is exerting an upward pull on the connecting bar 55 which is held up with its upper notch 57 engaged by the upper pin 49ᵇ on the controlling lever. The clutch of course is disengaged, with the driven clutch member at rest, the chain wound on the winding drum, and the driving clutch member rotating idly with the land wheel as the plow advances through the field.

Figure 10:
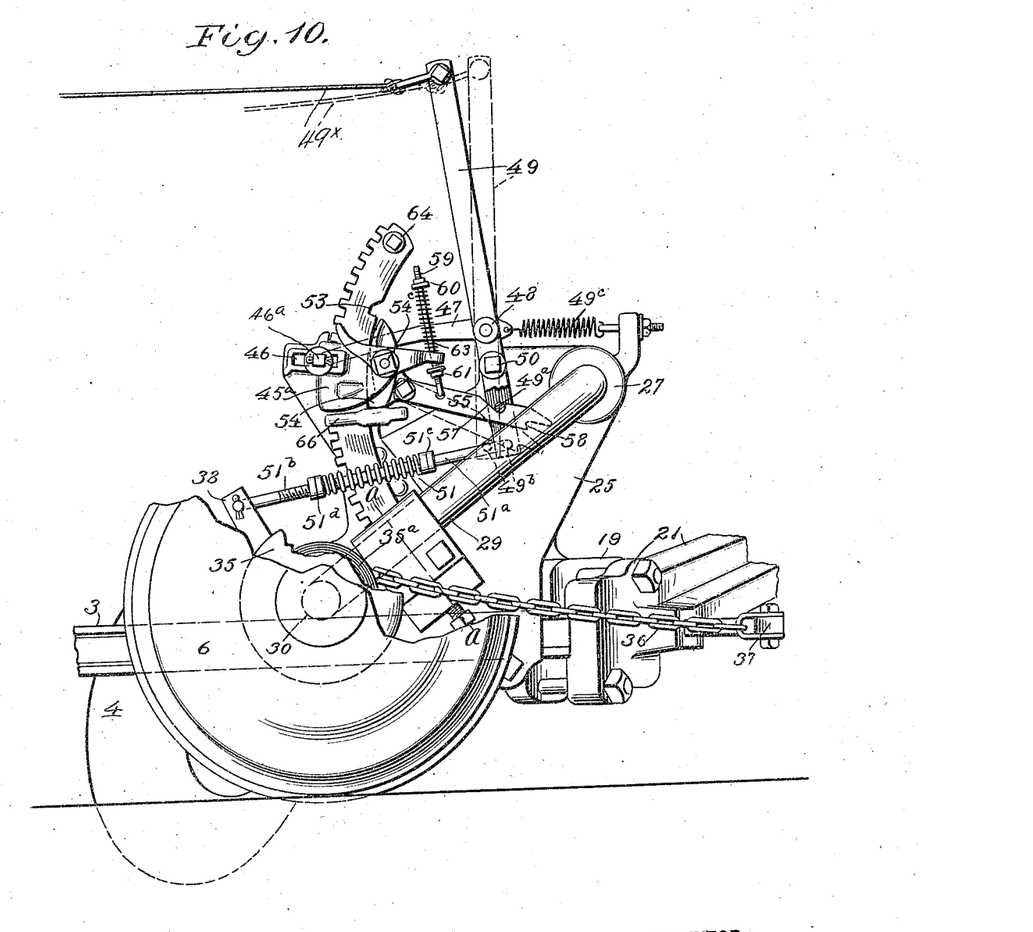
Fig. 10 is a view similar to Fig. 7 but with the plows lowered.

To lower the plows into the ground from the raised position of Fig. 7, the attendant pulls forward and maintains the pull on the cable 52 and rocks the controlling lever 49. This action will thrust the locking bolt 46ᵃ forwardly out of engagement with the rack bar, and will at the same time, owing to the engagement of the upper pin 49ᵃ on the controlling lever in the upper notch in the connecting bar 55, draw said bar rearwardly and rock the locking dog 54 and disengage the same from the rear notch in the rack bar. The rack bar now being entirely released, the land wheel axle will be free to rotate in its bearing and will swing upwardly and forwardly under the weight of the plows and frame, thereby unwinding the chain from the drum, and the plows will descend into the ground, the rack bar in this action moving upwardly through the guide in the supporting frame until limited by the engagement of an adjustable stop block 66 on the rack bar with the lower end of the housing on the supporting frame, whereupon the parts will come to rest with the plows in action as shown in Fig. 10. In this operation, as the rack bar begins to rise, the stop 64 thereon disengages the front end of the rocking lever 62, leaving the lever and the connecting bar 55 free to rock down at their rear ends, except for the engagement of the pin 49ᵃ on the controlling lever in the upper notch in the connecting bar. This engagement in connection with the engagement of the upper end of the detent 54 with the rear edge of the rack bar limits the throw of the controlling lever and prevents the same from moving sufficiently far to actuate the clutch controlling lever, the extensible link 51 in this action lengthening out and compressing spring 52. The driven member of the clutch and the winding drum therefor are free to rotate in reverse direction in unwinding the chain and offer no interference with the descent of the plows into action. The operator still has hold of the cable, and the controlling lever and bar 55 are in the full line position of Fig. 10. When the plows have thus reached their proper depth in the ground, as determined by the engagement of the stop block 66 with the housing on the supporting frame, the attendant releases the strain on the cable, whereupon spring 49ᶜ will draw the controlling lever and the locking bolt 46ᵃ rearwardly and will engage the bolt in one of the spaces between the teeth on the rack bar, thereby locking the same with the plows down as shown in Fig. 10. At the same time, the upper pin 49ᵃ on the controlling lever will disengage from the upper notch on the connecting bar, which latter will drop to the position shown by dotted lines in Fig. 10, and will leave the actuating lever free to be operated to its full extent to actuate the clutch lever when the plows are to be elevated.

From the foregoing description it will be noted that it is impossible in lowering the plows, for the attendant to pull the controlling lever far enough to throw the clutch into action, since the connecting bar 55 acts as a stop and will limit such movement to an extent sufficient only to release the rack bar from its locked position, the attendant in the lowering operation simply pulling forwardly on the cable and maintaining the strain thereon until the plows are fully lowered and then releasing the cable, which releasing action will automatically release the controlling lever from the limiting control of the connecting bar, and will leave the lever free to be fully operated when the plows are to be raised.

If now it is desired to raise the plows out of action to their full extent, from the dotted line position of Fig. 10, the attendant as before pulls forwardly on the cable, and there being no limiting action on the controlling lever such as was produced by the connecting bar 55 in the operation just described, the controlling lever will be operated to its full extent, and compressing spring 52 on the yieldable link, the clutch operating lever 38 will be drawn rearwardly and the clutch will be thrown into action, the lower pin 49ª on the controlling lever in this operation engaging in the lower notch 58 in the connecting frame as shown in Fig. 11, while at the same time the locking bolt 46ª will be disengaged from the rack bar. The attendant promptly releases the strain on the cable, but the controlling lever will be held forward by the connecting bar 55 and the connection of the clutch will be for the time being maintained and the locking bolt held free of the rack bar. The clutch being connected, the winding drum is turned by the rotation of the land wheel, and winding the chain thereon, the land wheel axle will be swung downwardly and rearwardly as indicated by the arrows in Fig. 11, thereby drawing the rack bar down through its guide and raising the plows out of action. This action will continue until the stop 64 on the rack bar brings up against the forward end of rocking lever 62, whereupon the rear end of said lever will be swung upwardly, and applying pressure to spring 63, the latter will exert a lifting force on the connecting bar 55 and will lift it from engagement with the pin 49ᵇ. This will release the controlling lever and it will be swung rearwardly at its upper end under the influence of spring 49ᶜ and spring 51 and will draw the locking bolt 46ª rearwardly and engage the same with the rack bar, the lower end of the controlling lever in this action moving forwardly and engaging the upper pin 49ª thereon in the upper notch in the connecting bar and at the same time disconnecting the clutch. Simultaneously with this action the nose on locking dog 54 will seat in the notch 53 in the rack bar and the latter will be locked with the plows raised as shown in Fig. 7.

In the operation of raising the plows to their full extent as described, it was seen that all the attendant had to do was to give a strong pull on the cable and then release the same, there being no necessity for observing any particular care in the strength of the pull, or any necessity for maintaining the strain on the cable. This is of advantage and importance, particularly in turning at the ends of the furrows, at which time the attendant's attention is fully occupied with the tractor in making the turn, and it being merely necessary, in effecting the elevation of the plows, to pull on the cable and then immediately release the same, the attendant's attention is not being taken from the tractor. It will be further observed that when the operator gives the cable a strong pull and then releases the same, the plows will be automatically raised to their full height and to the same height above the ground regardless of the depth to which they have been adjusted. This raising of the plows the same distance above the ground from all plowing depths, is an important feature, because it insures that the plows will be sufficiently high when raised to be easily transported. This result is secured by reason of the fact that the raising action continues when the powerlift has been set into operation until the mechanism is tripped out by the stop 64, Figure 7. When the plows are raised from a deep plowing position, the raising action continues for a longer period than when they are raised from a shallow plowing position, but in both cases, the raising mechanism is tripped out and stopped with the crank axle in the same position relative to the frame and the plows are consequently raised in both cases the same height above the ground.

Another feature is that the effective power of the powerlift is the same whether the plows are being lifted from a deep plowing position or from a shallow plowing position. If the mechanism were arranged to always lift the plows to the same height above the ground, but if in securing this action, the land wheel turned the same amount whether lifting from a deep plowing or shallow plowing position, it will be clear that the action would be secured at a sacrifice of power. In the present mechanism, the application of power is the same in all the lifting actions. The chain is wound on the drum during the lifting operation, such action continuing for a longer period when the plows are being lifted from a deep plowing position than when they are being lifted from a shallow plowing position. The power available is the same in both cases.

Still another feature is the level lift that is secured. By connecting the rear crank axle with the front furrow wheel axle, both are lifted together with the result that the diagonal beam between them is raised in such a manner that it remains substantially level.

If now it is desired to raise the plows "a notch at a time," the attendant pulls forward on the cable and rocks the controlling lever from the dotted line position of Fig. 10 a limited extent sufficient to engage the clutch, but not far enough to engage the lower pin on the controlling lever with the lower notch in the connecting bar, and the attendant retains his hold on the cable. This will disengage the locking bolt 46ª from the rack bar, and the chain being wound on the drum, the plows will begin to rise. When the proper elevation has been reached, the attendant quickly releases the cable, and the locking bolt again engaging the rack bar under the influence of spring 49ᵃ acting lever 49 and the reaction of spring 52 the plows will be locked in their new position, the connecting bar 55 in this operation resting loosely upon the lower pin of the controlling lever as shown by dotted lines in Fig. 10. By repeating this operation, the plows may be raised one or more notches at a time. Or, if the plows are to be lowered again a notch or more, the attendant pulls on the cable with less force and not sufficiently to engage the clutch, with the result that the locking bolt will be disengaged, and when the proper depth is reached the attendant releases the cable quickly as before, and the locking bolt will again engage the rack bar and lock the plows in position.

It is seen therefore that the attendant has complete and effective control over the operation of the parts and may either wholly raise or lower the plows or may adjust the same to the proper depth by a proper manipulation of the cable, and this without danger of throwing the clutch into action at an improper time, and without interfering with the proper control of the tractor.

In order that the forward end of the beam and frame supported by the front furrow wheel, may be raised and lowered in unison with the rear end supported by the land wheel, I mount the front furrow wheel stem in the frame so that it may be adjusted vertically, and I provide connections between the same and the land wheel axle, of such form and construction that when the land wheel axle is swung downwardly to raise the plows, the front furrow wheel stem, and consequently the furrow wheel, thereon, will also be moved down. In accomplishing this result I prefer to adopt the construction shown more particularly in Figs. 1, 2, 3, 4, 5, and 6, where it will be seen that the transverse frame bar 1 at the front is upturned at its furrow end in the form of a vertical post 68 on which is firmly and fixedly mounted a block or frame 69. This block is formed in rear of the post with a vertical bearing opening in which is loosely mounted so as to turn therein and also to shift endwise, a vertical furrow wheel stem 70 having swiveled on its upper end a head 70ᵃ, and having at its lower end an axle arm 71 on which the furrow wheel 2 is rotatably mounted. The head 70ᵃ is formed with a transverse bearing 72 in which is loosely mounted the lateral upper end 73 of an upright link 74, the lower end of which is bent laterally to form a stud 75. The stud is mounted loosely in a hole in the rear end of a horizontal arm 76 whose forward end is fixed to one end of a horizontal rock shaft 77 mounted in bearings 78 and 79 on the block 69 and sleeve 13ᵃ respectively. As a result of this construction, when the rock shaft 77 is rocked in a counter-clockwise direction (Fig. 3), the furrow wheel stem will be raised in its bearing and the furrow wheel correspondingly raised, and when the shaft is rocked in the opposite direction, the wheel will be lowered. The rock shaft has fixed to its opposite end an upright arm 80 on which is adjustably mounted to move up and down, a block 81 to which a yoke 82 is pivotally connected on a horizontal transverse axis. A fore and aft extending connecting rod 84, provided with a turn buckle 85, for adjusting its length is pivoted at its forward end to the yoke and is pivoted at its rear end to a second yoke 86 (Fig. 12), which latter yoke is pivoted to the free end of an arm 87 fixed to the journal 28 of the land wheel axle. Due to this construction and arrangement of the parts, when the land wheel axle is swung down to raise the rear end of the beam and plows, the arm 87 will pull rearwardly on the connecting rod 84 and the arm 80 on rock shaft 77 will be swung to the rear and rocking shaft 77 in a clockwise direction (Fig. 3), crank arm 76 will be swung down and the furrow wheel stem lowered in its bearing, and the furrow wheel correspondingly lowered. When, however, the land wheel axle is swung upwardly to lower the plows at the rear, the movements of the parts will be reversed and the front furrow wheel will be raised in unison. In this way the beam carrying the plowing disks is raised and lowered uniformly at the front and rear, and the level of the frame and plows maintained.

Figure 3:
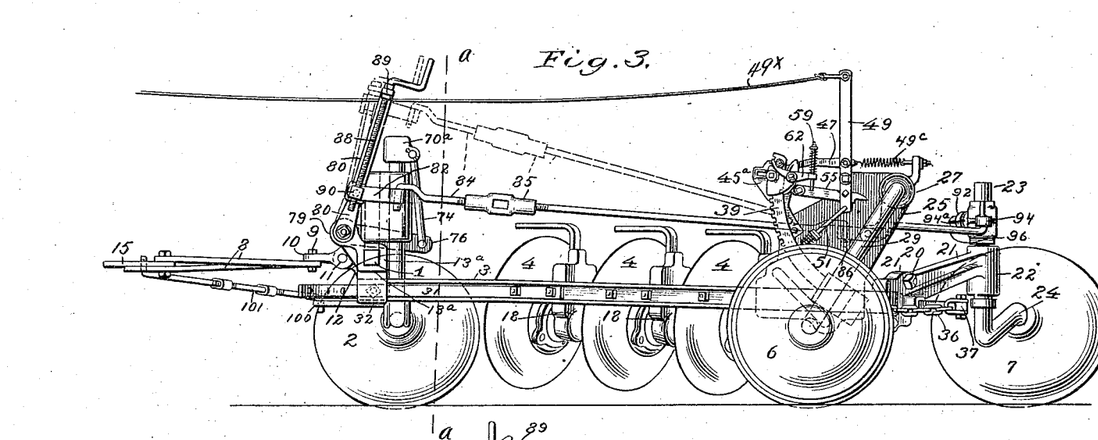
Fig. 3 is a side elevation of the plow as viewed from the land side, showing the plows raised out of action.
Figure 4:
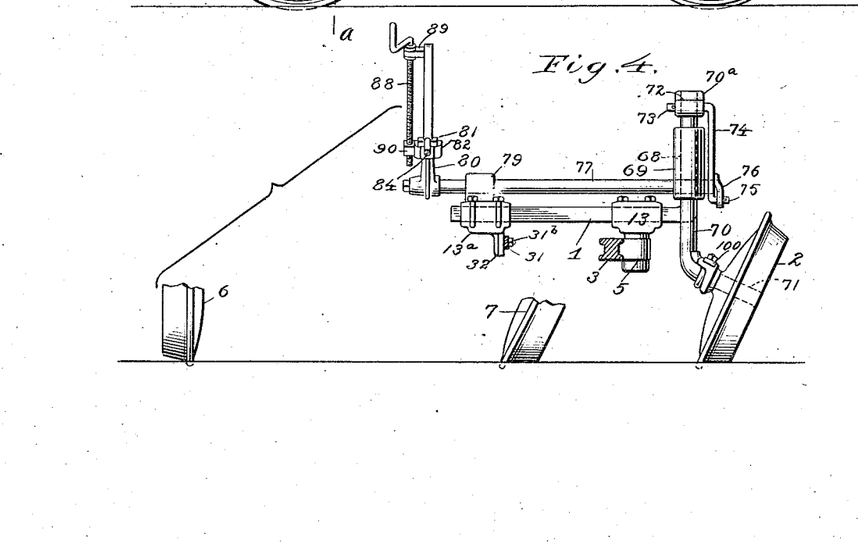
Fig. 4 is a transverse section of the same on the line $a$—$a$.
Figure 5:
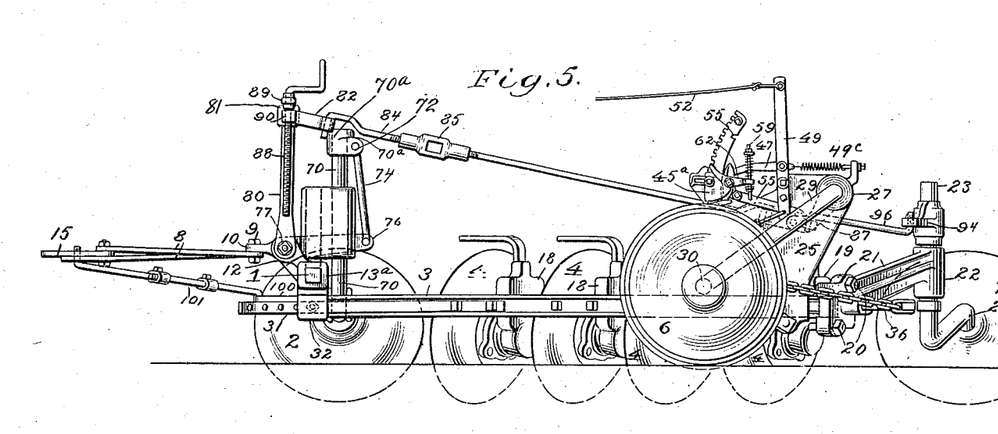
Fig. 5 is a view similar to Fig. 3 with the plows lowered in action.
Figure 6:
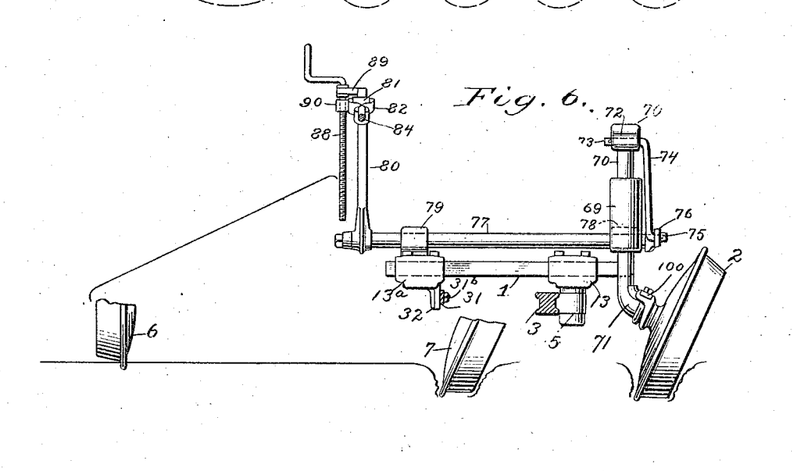
Fig. 6 is a view similar to Fig. 4 with certain parts in a different position, and with the relative positions of the land wheel and rear furrow wheel indicated.

The block 81 may be adjusted along the arm 80 by means of an adjusting feed screw-rod 38 extending along the side of the arm and rotatably mounted at its upper end in a bearing in a head 89 pivoted to the side of the arm on a horizontal transverse axis, the upper extremity of the screw-rod being provided with a crank for turning it. The rod is screwed in a nut 90 pivoted to the side of the block 81 on an axis parallel with that of the head 89, so that by rotating the screw-rod in one direction or the other, the block 81 will be adjusted up or down on the arm 80. The purpose of this adjustment among other things, is to vary the vertical relations of the land wheel and front furrow wheel to enable the two wheels to travel on the land when the plow is being transported as shown in Fig. 3, or to enable the furrow wheel to travel in the furrow and the land wheel on the land when the plow is in operation as shown in Fig. 5, while at the same time preserving the level of the beam and plows under the different adjustments.

In order that when the plows are raised the rear furrow wheel will be allowed to caster freely in making a turn, and in order that when the plows are lowered again, the furrow wheel will be controlled as to its castering action and be caused to automatically line up and follow in the furrow of the rear disk, I adopt the construction shown more particularly in Fig. 12. Here it will be seen that the rear furrow wheel stem 23 has fixed to it above the bearing 22, a collar 91 provided with a lug 92 in which is screwed a bolt 93 constituting an adjustable stop, the purpose of which will presently appear. Above the collar the stem is loosely encircled by the inner end of an arm 94 having a shoulder 94ª in position to engage the stop 93; and to the outer end of this arm is pivoted a head 95 on a vertical axis. A link 96 has its rear end pivoted to the head 95 on a horizontal axis, and has its forward end pivoted on a vertical axis to a second head 97 which is in turn pivoted to the side of the arm 87 on a horizontal axis. The form and relation of these parts and connections are such that when the land wheel is swung down to raise the plows, the arm 87 swinging to the rear, will force the arm 94 rearwardly and carry its stop shoulder 94ª away from the stop bolt 93, thereby leaving the furrow wheel stem free to turn in its bearings and permitting the furrow wheel to caster freely. When now the land wheel axle is swung up to lower the plows, a reverse action of the arms 87 and 94 will take place, with the result that the shoulder of arm 94 will engage the stop 93 and the furrow wheel stem will be positively turned around until the wheel lines up in proper position to follow in the furrow.

The front furrow wheel is provided at a point below its bearing, with a forwardly extending arm 100 which is connected by means of a draft link 101 with the draft plate 15, by which means the front furrow wheel will be turned relatively to the frame in the guiding movements of the latter.

By the provision of the turn buckle 85 in the rod 84, the length of the rod may be varied to compensate for the different relations of the parts in the adjustments of the disk carrying beam, it being necessary to lengthen the rod when the beam is adjusted furrowward, and necessary to shorten the rod when the beam is adjusted landward.

In the accompanying drawings and foregoing description I have disclosed my invention in the particular detailed construction which I prefer to adopt, but it will be manifest to the skilled mechanic that the details may be variously changed and modified without departing from the limits of my invention; and it will be understood that the invention is not limited to any particular form or construction of the parts except in so far as such limitations are specified in the claims.

Having thus described my invention, what I claim is:

1. In a plow, the combination of a frame adapted to carry plowing devices, a wheel support mounted on the frame and movable relatively thereto to raise and lower the plowing devices, a ground wheel rotatable on said support, means operated by the rotation of the ground wheel for moving said wheel support, a clutch for controlling the operation of said means, a rack bar carried by the wheel support, a locking device for the rack bar mounted on the frame, a controlling lever for the locking device, and a connection between the controlling lever and clutch.

2. In a plow the combination of a frame adapted to carry plowing devices, a wheel support journaled in the frame to swing up and down relatively thereto to raise and lower the plowing devices, a ground wheel rotatable on the wheel support, means operated by the rotation of the ground wheel for swinging the wheel support, a clutch for controlling the operation of said means, a rack bar connected at its lower end to the wheel support and curved upwardly in an arc struck from the pivotal axis of the wheel support as a centre, a locking device on the frame for locking the rack bar, a controlling lever for the locking device mounted on the frame, and connections between the controlling lever and the clutch.

3. In a plow, the combination of a frame adapted to carry plowing devices, a wheel support mounted on the frame and movable relatively thereto to raise and lower the plowing devices, a ground wheel on the wheel support, means operated by the rotation to the ground wheel for moving the wheel support to raise the plowing devices, a clutch for controlling the operation of said means, a locking dog mounted on the frame in position to lock the wheel support with the plows in raised position, a controlling lever for the dog mounted on the frame, a connecting device between the dog and controlling lever, and a connection between the lever and the clutch, said connecting device acting as a stop when in one position to limit the movement of the controlling lever and thereby preventing the operation of the clutch, and when in another position permitting the controlling lever to be operated to connect the clutch.

4. In a plow, the combination of a frame adapted to carry plowing devices, a wheel support mounted on the frame and movable relatively thereto to raise and lower the plowing devices, a ground wheel on the wheel support, means operated by the rotation of the ground wheel for moving the wheel support to raise the plowing devices, a clutch for controlling the operation of said means, a locking dog mounted on the frame in position to lock the wheel support with the plows raised, a controlling lever for said dog mounted on the frame, a connecting bar pivoted to the dog in position to be engaged by the controlling lever when the dog is in locking position, and movable out of engagement with the lever when the dog is in unlocking position, and a connection between the controlling lever and clutch.

5. In a plow, the combination of a frame adapted to carry plowing devices, a wheel support mounted on the frame and movable relatively thereto to raise and lower the plowing devices, a ground wheel on the wheel support, means operated by the rotation of the ground wheel for moving the wheel support to raise the plowing devices, a clutch for controlling the operation of said means, a locking dog on the frame in position to lock the wheel support with the plows raised, a controlling lever for the dog mounted on the frame, a connecting bar pivoted to the dog in position to be engaged by the controlling lever when the dog is in unlocking position and acting to limit the movement of the controlling lever, said bar being movable out of engagement with the lever when the dog is in unlocking position, and a connection between the lever and the clutch, said connecting bar when the controlling lever is operated to connect the clutch, being adapted to engage with the lever and hold the clutch connected.

6. In a plow, the combination of a frame adapted to carry plowing devices, a wheel support mounted on the frame and movable relatively thereto in raising and lowering the plowing devices, a ground wheel on the support, means operated by the rotation of the ground wheel for moving the wheel support to raise the plowing devices, a clutch for controlling the operation of said means, a controlling lever mounted on the frame and connected with the clutch for operating it, a rack bar on the wheel support, a locking bolt for the rack bar connected with the controlling lever, and a locking dog also connected with the controlling lever in position to engage the rack bar and lock the same with the plows raised.

7. In a plow, the combination of a frame adapted to carry plowing devices, a wheel support mounted on the frame and movable relatively thereto in raising and lowering the plows, a ground wheel on the support, means operated by the ground wheel for moving the wheel support to raise the plowing devices, a clutch for controlling the operation of said means, a locking device mounted on the frame in position to lock the support with the plows raised, a controlling lever connected with the clutch, and a connection between the locking device and the controlling lever, said connection being in position to be engaged by the controlling lever and limit the movement of the same when the lever is operated to release the locking device, and being adapted to be engaged by the lever when the latter is operated to connect the clutch and then to hold the lever with the clutch connected.

8. In a plow, the combination of a frame adapted to carry plowing devices, a wheel support mounted on the frame and movable relatively thereto in raising and lowering the plows, a ground wheel on the support, means operated by the ground wheel for moving the wheel support to raise the plowing devices, a clutch for controlling the operation of said means, a locking device mounted on the frame in position to lock the support with the plows raised, a controlling lever connected with the clutch, a connection between the locking device and the controlling lever, said connection being in position to be engaged by the controlling lever and limit the movement of the same when the lever is operated to release the locking device, and being adapted to be engaged by the lever when the latter is operated to connect the clutch and then to hold the lever with the clutch connected, and means for automatically releasing the lever when the plows reach their full elevation.

9. In a plow, the combination of a frame to carry plowing devices, a wheel support mounted on the frame and movable relatively thereto to raise and lower the plowing devices, a ground wheel on the support, means operated by the rotation of the ground wheel for moving the support to raise the plowing devices, a clutch for controlling the operation of said means, a locking dog on the frame in position to lock the wheel support with the plowing devices raised, a controlling lever on the frame connected with the clutch, a movable connecting device between the lever and the locking dog, and means acting when the plows are locked raised to hold the connecting device engaged with the lever to limit the movement of the same, and thereby prevent the clutch from being connected, said means operating when the wheel support is released and begins to rise, to automatically release the controlling lever.

10. In a plow, the combination of a frame to carry plowing devices, a wheel support mounted on the frame and movable relatively thereto to raise and lower the plowing devices, a ground wheel mounted on the support, means operated by the rotation of the ground wheel for moving the support to raise the plowing devices, a clutch controlling the operation of said means, a rack bar on the wheel support, a locking dog on the frame in position to engage the rack bar and hold the plowing devices raised, a controlling lever on the frame connected with the clutch, a connecting bar pivoted to the locking dog and provided with a notch to receive a pin on the controlling lever, a rocking lever on the frame, a rod connected with the connecting bar and slidingly engaged with one end of the rocking lever, a spring on said rod bearing respectively on the rocking lever and rod, and a stop on the rack bar in position to engage the opposite end of the rocking lever when the rack bar is in lowered position with the plows raised; whereby the connecting frame, held by the spring in engagement with the controlling lever, will be automatically released when the stop disengages the rocking lever in the rise of the rack bar.

11. In a plow, the combination of a frame to carry plowing devices, a wheel support mounted on the frame and movable relatively thereto to raise and lower the plowing devices, a ground wheel on said support, means operated by the rotation of the ground wheel for moving the support to raise the plowing devices, a clutch controlling the operation of said means, a clutch operating lever, a locking device on the frame in position to lock the wheel support with the plowing devices raised, a controlling lever on the frame operatively connected with the locking device, and an extensible connecting device between the controlling lever and the clutch operating lever, said device including a spring arranged to be placed under tension when the connecting device is extended by the actuation of the clutch lever; whereby the spring in reacting will restore the controlling lever to its normal position.

12. In a plow, the combination of a frame to carry plowing devices, a front furrow wheel support mounted on the frame to move up and down relatively thereto and carrying a furrow wheel, a transverse rock shaft mounted on the frame and operatively connected with the furrow wheel support to move it up and down, an upright crank arm fixed to the rock shaft, a feed screw journaled on the crank arm, a sliding block threaded to the feed screw to be moved thereby longitudinally of the crank arm, a land wheel support mounted on the rear of the frame to move up and down relatively thereto and carrying a land wheel, and a link operatively connected at one end to said land wheel support and pivoted at its opposite end to the said sliding block.

13. A powerlift plow having plow beams, supporting wheels, a crank axle, lifting mechanism operated by power from one of the supporting wheels for swinging the crank axle to lift the plow beams, means for adjusting the crank axle to vary the depth of plowing, and controlling means for the powerlift mechanism, including a control lever, the momentary actuation of which will set the powerlift into operation, said powerlift mechanism serving, when set into operation to lift the plows, to continue in operation until automatically stopped by the controlling means, and said controlling means serving after setting the powerlift into operation to automatically stop the powerlift mechanism after varying predetermined movements depending upon the depth of adjustment, at a point such that the plows are always lifted to their full height above the ground from all plowing positions to which they may have been adjusted.

14. A powerlift plow having plow beams, supporting wheels, a crank axle, lifting mechanism operated by power from one of the supporting wheels for swinging the crank axle to lift the plow beams, means for adjusting the crank axle to vary the depth of plowing, and controlling means for the powerlift mechanism, including a control lever, the momentary actuation of which will set the powerlift into operation, said powerlift mechanism serving, when set into operation to lift the plows, to continue in operation to lift the plows from any depth to which they may have been adjusted until automatically stopped by the controlling means at a point where the plows are at their full height above the ground, the powerlift mechanism being constructed so that the power exerted by it will be substantially the same during the entire lifting operation and for all lifting operations from all depths of plowing.

15. A powerlift plow having plow beams, supporting wheels, a crank axle, lifting mechanism operated by power from one of the supporting wheels for swinging the crank axle to lift the plow beams, controlling means for the lifting mechanism arranged so that, when tripped with the plows in lowered position, the lifting mechanism will be set into operation and will continue to operate until the plows are lifted out of the ground, the association and construction of the lifting mechanism and the controlling means being such that the plows are lifted to their full height above the ground from all plowing positions, said controlling means including mechanism by means of which the depth of plowing may be adjusted through the controlling means.

16. A powerlift plow having plow beams, supporting wheels, a crank axle, lifting mechanism operated by power from one of the supporting wheels for swinging the crank axles to lift the plow beams, locking means for locking the plow beams in raised position, and controlling mechanism for both the locking means and the powerlift mechanism serving, when actuated for lifting the plows out of the ground, to unlock the locking means and set the powerlift mechanism into operation, said powerlift mechanism continuing in operation until automatically stopped by the controlling means which thereupon locks the plows in raised position, said controlling means, when actuated with the plows raised, serving to unlock the locking means, but not to actuate the powerlift mechanism, said controlling means having mechanism associated therewith for positively preventing it from setting the lifting mechanism into operation.

In testimony whereof, I have affixed my signature hereto.

HARRY S. DICKINSON.